United States Patent Office 3,201,395
Patented Aug. 17, 1965

3,201,395
Δ[1,4]-3-OXO-18-NOR- AND -18-OXYGENATED-ANDROSTADIENES
Albert Wettstein, Riehen, and Ernst Vischer and Jakob Urech, Basel, Switzerland, assignors to Ciba Corporation, New York, N.Y., a corporation of Delaware
No Drawing. Filed Sept. 12, 1962, Ser. No. 223,256
Claims priority, application Switzerland, Sept. 21, 1961, 10,972/61
2 Claims. (Cl. 260—239.57)

The present invention provides new and useful steroidal compounds obtainable by a microbiological process for oxidising steroids of the pregnane or androstane series. U.S. Patent 2,904,472 describes a process for the biochemical degradation of the side chain of pregnane compounds to androstane compounds and, if desired, splitting the ring D, accompanied by the introduction of a double bond in position 1:2 and if desired in position 4:5; according to said process compounds of the pregnane or androstane series substituted by oxygen functions in positions 3 and 20 or 17 are incubated, for example, with fungi of the species *Fusarium solani* or *Fusarium caucasicum*. In this manner it is possible, for example, to convert progesterone, Δ[5]-3β-hydroxy-20-oxopregnene, 11-desoxycorticosterone or 3:20-dioxo-allopregnane in a single process step into Δ[1,4]-3:17-dioxoandrostadiene or 1:2-dehydrotestolo-lactone respectively.

The present invention is based on the observation that new substances are obtained by reacting fungi of the species *Fusarium solani*, or enzymes prepared therefrom, under aerobic conditions upon (18:11β)-lactones of 11β-hydroxy-18-acids of the pregnane or androstane series that contain in position 3 a free or esterified hydroxyl group or an oxo group, in position 20 of the pregnane derivatives an oxo group, or in position 17 of the androstane derivatives an oxo group or a free or esterified hydroxyl group.

In addition to the oxydation which causes degradation of the pregnane side chain to the oxo group, as well as dehydrogenation of a hydroxyl group in position 3 and the introduction of the 1:4-diene system in ring A, elimination of the 18-acid group takes place, leading to compounds of the 18-nor series. However, compounds containing an intact (18:11β)-lactone group, the Δ[1,4]-3-ketosystem in ring A and an oxo or hydroxyl group in position 17 can likewise be produced. Whether one or the other of these different reaction products is formed depends on the duration of the incubation.

The reaction of the invention is illustrated by the following scheme for the example of the (18:11β)-lactone of Δ[4]-3:20-dioxo-11β-hydroxypregnene-18-acid

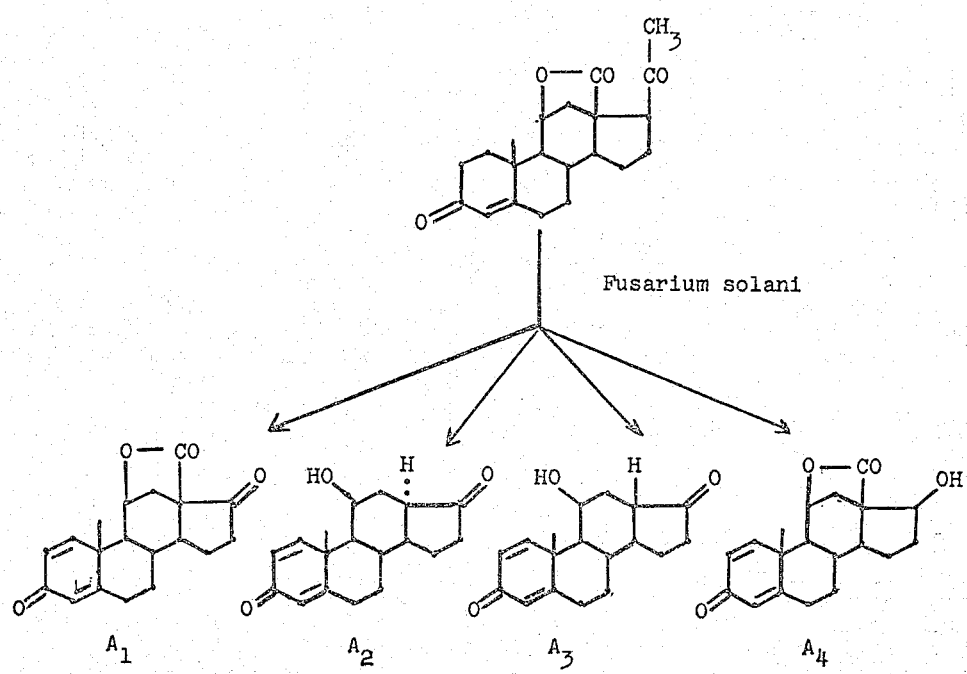

In the course of the reaction compounds of the type $A_1$ are initially formed, whereas on prolonged incubation the products of types $A_2$–$A_4$ begin to preponderate.

The fungus can be grown in media known for this purpose, for example, those prepared with sugars such as glucose or lactose, with peptones, corn steep liquir, soybean products and the like, or with mineral salts, or synthetic nutrient solutions. The incubation is preferably carried out under aerobic conditions, for example in agitated cultures or, in the case of submerged cultures, with stirring and aeration. The reaction of the present invention takes place in the fungus culture described or with the aid of the enzymes contained in it, which may be enriched or isolated, that is to say in the simplest case in a suspension of the isolated fungus mycelium, of the homogenised fungus mycelium or in filtrates or aqueous extracts thereof.

The starting materials used for the new process are saturated or unsaturated (18:11β)-lactones of 11β-hydroxy-18-acids of the pregnane, allopregnane or androstane series. They may contain double bonds, for example, in position 1, 4, 5, 6, 7, 8 or 14, or they may contain additional substituents such as free or protected hydroxyl or oxo groups, also epoxy groups, halogen atoms, or alkyl, more especially lower alkyl groups such as methyl groups, for example, in position 2, 6, 7, 15, 16 or 21. The choice of the aforementioned starting materials includes also those of the 19-nor series. A protected hydroxyl group is a hydroxyl group esterified with an aliphatic, aromatic or heterocyclic carboxylic acid, for example formic, acetic, propionic, benzoic, or furan-carboxylic acid, or an etherified hydroxyl group, for example the tetrahydropyranyloxy, benzyloxy or triphenylmethoxy group. A protected oxo group is, for example, a ketalized oxo group, preferably one derived from a dihydric alcohol, such as the ethylenedioxy group. Specific starting materials are, for example: (18:11β)-lactone of $\Delta^4$-3:20-dioxo-11-hydroxy-pregnene-18-acid,
$\Delta^4$-3:20-dioxo-11:14-dihydroxy-pregnene-18-acid,
$\Delta^5$- or $\Delta^4$-3:11-dihydroxy-20-oxo-pregnene-18-acid,
$\Delta^4$-3:20-dioxo-11:21-dihydroxy-pregnene-18-acid,
$\Delta^4$-3:17-dioxo-11-hydroxy-androstene-18-acid,
$\Delta^4$-3-oxo-11:17-dihydroxy-androstene-18-acid,
$\Delta^4$-3:11-dihydroxy-17-oxo-androstene-18-acid,
d-$\Delta^{1:4}$-3:20-dioxo-11β-hydroxy-pregnadiene-18-acid,
3:20-dioxo-11-hydroxy-pregnane-18-acid,
3:11-dihydroxy-20-oxo-pregnane-18-acid,
3:17-dioxo-11-hydroxy-androstane-18-acid,
3:20-dioxo-11-hydroxy-allopregnane-18-acid,
3β-acetoxy-11-hydroxy-20-oxo-allopregnane-18-acid, and the corresponding compounds containing protected hydroxyl or oxo groups.

In the resulting compounds functionally converted hydroxyl or oxo groups can be converted into free groups, or free hydroxyl or oxo groups can be functionally converted in known manner, for example esterified or etherified. The hydroxyl group in position 11 can be oxidized in known manner to an oxo group or the 17-keto group can be reduced to a hydroxyl group.

In the 17α-position of a resulting $\Delta^{1:4}$-3:17-dioxo-11β-hydroxy-18-nor-androstadiene or of a corresponding 13-iso compound the radical of a lower aliphatic hydrocarbon such, for example, as an ethinyl group, can be introduced in known manner.

The introduction of the aforementioned aliphatic hydrocarbon radical, for example of the ethinyl group in position 17α is achieved by reaction with a suitable aliphatic metal compound such as an alkali metal acetylide, such as potassium acetylide. An ethinyl group can then be converted by suitable choice of the reaction conditions into an ethenyl and an ethyl radical.

In the esters of the products of the present process the acid radicals are those of saturated or unsaturated aliphatic, cycloaliphatic, aromatic or heterocyclic carboxylic acids, preferably those having from 1 to 20 carbon atoms, for example, radicals of formic, acetic, propionic acid, a butyric or valeric acid such as n-valeric acid or trimethylacetic acid, of a caproic acid such as β-trimethylpropionic acid, of oenanthic, caprylic, pelargonic, capric, or undecylic acids, for example of undecylenic acid, of lauric, myristic, palmitic or stearic acids, for example of oleic acid, of cyclopentyl-, cyclohexyl- or phenyl-acetic or -propionic acids, benzoic acids, phenoxy-alkanoic acids, such as phenoxyacetic acid, para-chlorophenoxy - acetic acid, 2:4-dichlorophenoxyacetic, 4-tertiary butylphenoxyacetic, 3-phenoxypropionic, 4-phenoxybutyric, furan - 2 - carboxylic, 5-tertiary butyl-furan-2-carboxylic, 5-bromofuran-2-carboxylic acid, of the nicotinic acids, or of dicarboxylic acids such as oxalic, succinic or glutaric acids, of substituted carboxylic acids such as β - keto - carboxylic acids, for example of the acetoacetic, propionylacetic, butyrylacetic, or caprinoylacetic acid, of amino acids and the like.

The products of the present process have progestative, anabolic, androgenic and "anti-aldosterone" action and are suitable for the manufacture of medicaments. Furthermore, they are suitable as intermediates for the manufacture of physiologically valuable compounds.

The products of the present process can be isolated by known methods, for example by extracting the reaction mixture with an organic solvent, such as methylene chloride or ethyl acetate. The resulting extract is purified with special advantage by chromatography, for example on alumina, silica gel or cellulose powder, or by distribution methods, for example, the counter-current method; or the separation may be performed with the aid of a Girard reagent such as trimethylammonium or pyridineacetic hydrazide. Following upon its purification, or instead of the purification, the product is finally preferably recrystallized from an organic or aqueous organic solvent.

The (18:11β)-lactones of 11β-hydroxy-18-acids of the pregnane or androstane series used as starting materials are known or can be manufactured by known methods. The present invention includes also any variant of the present process in which the lactones obtained by this process are subjected to the incubation with the aforementioned species of fungus.

The compounds obtained by the present process are suitable for use as medicaments, for example, in the form of preparations containing one of the new compounds in conjunction with a solid or liquid medicinal excipient. The preparations are formulated in such known manner, for example, with the use of a pharmaceutical organic or inorganic excipient suitable for parenteral, enteral or local administration. Suitable excipients are substances that do not react with the new compounds such, for example, as water, vegetable oils, benzyl alcohols, polyethylene glycols, gelatine, lactose, starch, magnesium stearate, talc, white petroleum jelly, cholesterol or other medicinal excipients. There are prepared more especially preparations for parenteral administration preferably solutions, above all oily or aqueous solutions, furthermore suspensions, emulsions or depot preparations; for enteral administration there are further made in a similar manner tablets or dragées, and for local administration also ointments or creams. The preparations may be sterilized or they may contain assistants such as preserving, stabilizing, wetting or emulsifying agents, salts for regulating the osmotic pressure or buffers. They may also contain other therapeutically active compounds. The preparations are formulated in known manner.

The following examples illustrate the invention.

*Example 1*

A nutrient solution is prepared which contains per litre of tap water 5 cc. of corn steep liquor, 20 grams of peptone and 50 mg. of glucose and is adjusted with sodium hydroxide solution to pH=6.2. Two shaking vessels of 10 litres' capacity are charged with 4 litres each of the above nutrient solution and sterilized for thirty minutes under a pressure of 1.1 atmospheres (gauge), which is then cooled to room temperature and inoculated with a vegetable culture of *Fusarium solani* (Mart.) App. et. Wr. (Ciba strain No. 34) previously grown in conical flasks of 500 cc. capacity with 100 cc. each of the aforementioned nutrient solution. The contents of the flasks are shaken, while being superficially aerated, for 26 hours at 26 to 28° C.; the well-developed cultures are then treated under sterile conditions with 2 grams each of the (18:11)-lactone of $\Delta^4$-3:20-dioxo-11β-hydroxy-pregnene-18-acid dissolved in 50 cc. of acetone and further shaken at the same temperature while being aerated in an identical manner. The reaction of the substratum is periodically checked by paper chromatographic examination. For this purpose measured samples are taken from the culture, extracted with ethyl acetate and aliquot portions are chromatographed in the system formamide/benzene on strips of paper. After 4½ days starting material can no longer be detected. Instead, at least 3 ultraviolet-absorbing conversion products are identified which display in the above paper chromatographic system a stronger polar behaviour than the parent steroid. None of the three conversion products reduces blue tetrazolium chloride or displays the fluorescence with sodium hydroxide solution typical of $\Delta^4$-3-keto steroids.

After 5 days' incubation the cultures are suctioned off, the mycelium is thoroughly washed with ethyl acetate and the culture filtrate, which has a pH value of 9, is adjusted with aqueous acetic acid of 50% strength to pH=6, saturated with sodium chloride and extracted with 3 x 4 litres of ethyl acetate. The ethyl acetate extracts are washed with sodium chloride solution of 10% strength, dried with sodium sulfate and evaporated under vacuum, to yield 2.85 grams of crude steroid extract which is separated on a column of 120 grams of silica gel (Davison No. 922) inactivated with 2% by weight of water, and the individual fractions are subjected to paper chromatography (in the system formamide/benzene):

| Fraction | Litres | | Mg. | |
|---|---|---|---|---|
| 1-4 | 2.4 | $CH_2Cl_2$ | 438 | Oily, non-steroid material. |
| 5-10 | 3 | $CH_2Cl_2$-acetone 99:1. | | |
| 11-13 | 1.8 | $CH_2Cl_2$-acetone 98:2. | 57 | $\Delta^{1.4}$-3-keto-steroid, less polar than parent steroid. |
| 14-20 | 3.12 | $CH_2Cl_2$-acetone 96:4. | 809 | Substance $A_1$, $R_f$ 0.65. |
| 21 | 0.6 | $CH_2Cl_2$-acetone 94:6. | | |
| 22 | 0.48 | $CH_2Cl_2$-acetone 94:6. | 70 | Mixture of $A_1$ and $A_2$. |
| 23-24 | 0.96 | $CH_2Cl_2$-acetone 94:6. | 175 | Substance $A_2$, $R_f$ 0.42. |
| 25-33 | 5.56 | $CH_2Cl_2$-acetone 9:1. | 923 | Mixture of substances $A_2$, $A_3$, and $A_4$ ($R_f$ 0.42, 0.20 and 0.20). |

$A_1$ = (18:11)-lactone of $\Delta^{1:4}$-3:17-dioxo-11$\beta$-hydroxyandrostadiene-18-acid.
$A_2$ = 13-iso-$\Delta^{1:4}$-3:17-dioxo-11$\beta$-hydroxy-18-nor-androstadiene.
$A_3$ = $\Delta^{1:4}$-3:17-dioxo-11$\beta$-hydroxy-18-nor-androstadiene.
$A_4$ = (18:11)-lactone of the $\Delta^{1:4}$-3-oxo-11$\beta$:17$\beta$-dihydroxyandrostadiene-18-acid.

Fraction 22 as well as fractions 25 to 33 are subjected to preparative separation on 450 sheets of unwashed Whatman paper No. 1 with the use of the system formamide/benzene in the chromatoblock and the two main zones absorbing ultra-violet having the $R_f$ values 0.42 and 0.20 respectively are eluted. The elution consists in treating the zone strips with methanol/water mixture 1:4 and repeated extraction of the pulps formed with acetone. The extracts are freed under vacuum from acetone and methanol and the residual aqueous suspension is exhaustively extracted with methylene chloride. In this manner, after having evaporated the solvent, there are obtained from the zone of $R_f$ 0.42: 4.2 grams of crude eluate of 13-iso-$\Delta^{1:4}$-3:17 - dioxo - 11$\beta$ - hydroxy-18-nor-androstadiene, and of $R_f$ 0.20: 3.9 grams of crude eluate of $\Delta^{1:4}$-3:17-dioxo-11$\beta$-hydroxy-18-nor-androstadiene and the (18:11)-lactone of $\Delta^{1:4}$-3-oxo-11$\beta$-17$\beta$-dihydroxy-androstadiene-18-acid.

The 4.2 grams of crude 13-iso-$\Delta^{1:4}$-3:17-dioxo-11$\beta$-hydroxy-18-nor-androstadiene are purified with 10 times that weight of activated silica gel; methylene chloride/acetone (85:15) elutes 275 mg. of partially crystalline 13-iso-$\Delta^{1:4}$-3:17-dioxo - 11$\beta$ - hydroxy-18-nor-androstadiene, while the oily contaminants are contained in the pre-fractions with methylene chloride and in the subsequent fractions with methylene chloride/acetone 4:1 and 1:1.

Analogous purification of the crude eluate from the zone of $R_f$ 0.20 yields 268 mg. of a partially crystallizing mixture of the substances $\Delta^{1:4}$-3:17-dioxo-11$\beta$-hydroxy-18-nor-androstadiene ($A_3$) and (18:11)-lactone of $\Delta^{1:4}$-3-oxo-11$\beta$:17$\beta$-dihydroxy-androstadiene-18-acid ($A_4$).

Example 2

The fractions 14–21 (containing substance $A_1$) described in Example 1 are recrystallized from acetone +ether. Working up of the mother liquors yields 644 mg. of the (18:11)-lactone of $\Delta^{1:4}$-3:17-dioxo-11$\beta$-hydroxy-androstadiene-18-acid melting at 320 to 322 C. with decomposition. The ultra-violet spectrum in ethanol contains a maximum at 240 m$\mu$, $\epsilon$=15400. The infra-red spectrum in Nujol contains bands at 5.66$\mu$ ($\gamma$-lactone), 5.74$\mu$ (5-ring ketone), 6.01, 6.14 and 6.21$\mu$ ($\Delta^{1:4}$-3-ketone).

Result of paper chromatographic examination:

| | Temperature, ° C. | $R_f$ | $R_S$ (S=desoxycorticosterone) |
|---|---|---|---|
| Bush $Bl_1$ | 38 | 0.79 | 0.84 |
| Bush $B_1$ | 38 | 0.37 | 0.48 |
| Formamide/cyclohexane-benzene 1:2 | 22 | 0.33 | 0.44 |
| Formamide/benzene | 22 | 0.65 | 0.77 |
| Propylene glycol/toluene | 22 | 0.64 | 0.80 |
| Reaction with meta-dinitro-benzene (Zimmermann reaction) | Purple | | |
| Reaction with blue tetrazolium chloride | Negative | | |
| Fluorescence with sodium hydroxide solution | Nil | | |

Example 3

The fractions 23 and 24 described in Example 1, as well as the pre-purified eluate of 13-iso-$\Delta^{1:4}$-3:17-dioxo-11$\beta$-hydroxy-18-nor-androstadiene from the paper chromatographic separation are recrystallized from acetone+ether, to give a total yield of 340 mg. of 13-iso-$\Delta^{1:4}$-3:17-dioxo-11$\beta$-hydroxy-18-nor-androstadiene ($A_2$) melting at 248 to 251° C. The ultraviolet spectrum in ethanol contains a maximum at 244 m$\mu$, $\epsilon$=15300. The infra-red spectrum in Nujol contains bands at 2.92$\mu$ (hydroxyl), 5.78$\mu$ (5-ring ketone), 6.02, 6.15 and 6.25$\mu$ ($\Delta^{1:4}$-3-ketone).

Result of paper chromatographic examination:

| | Temperature, ° C. | $R_f$ | $R_S$ (S=desoxycorticosterone) |
|---|---|---|---|
| Bush $Bl_1$ | 38 | 0.74 | 0.79 |
| Bush $B_1$ | 38 | 0.37 | 0.48 |
| Formamide/cyclohexane-benzene 1:2 | 22 | 0.23 | 0.30 |
| Formamide/benzene | 22 | 0.42 | 0.55 |
| Propylene glycol/toluene | 22 | 0.34 | 0.43 |
| Bush $B_3$ | 38 | 0.17 | 0.34 |
| Reaction with blue tetrazolium chloride | Negative | | |
| Fluorescence with sodium hydroxide solution | Nil | | |
| Reaction with metadinitrobenzene | Purple | | |

Example 4

228 mg. of a pre-purified mixture of $\Delta^{1:4}$-3:17-dioxo-11$\beta$-hydroxy-18-nor-androstadiene and (18:11)-lactone of $\Delta^{1:4}$-3-oxo-11$\beta$:17$\beta$-dihydroxy-androstadiene-18-acid from the paper-chromatographic crude eluate are subjected to fractional crystallization from acetone+ether. The first crystallisates yield a total of 63 mg. of the (18:11)-lactone of $\Delta^{1:4}$-3 - oxo - 11$\beta$:17$\beta$-dihydroxyandrostadiene-18-acid melting at 310 to 314° C. The ultra-violet spectrum in ethanol contains a maximum at 242 m$\mu$, $\epsilon$=16000. The infra-red spectrum in Nujol contains bands at 2.88$\mu$ (hydroxyl), 5.64$\mu$ ($\gamma$-lactone), 5.99, 6.15 and 6.24$\mu$ ($\Delta^{1:4}$-3-ketone).

Repeated crystallization of the mother liquors from acetone+ether yields 95 mg. of $\Delta^{1:4}$-3:17-dioxo-11$\beta$-hydroxy-18-nor-androstadiene melting at 199 to 202° C. The ultra-violet spectrum in ethanol contains a maximum at 243 m$\mu$, $\epsilon$=14800. The infra-red spectrum contains bands at 2.96$\mu$ (hydroxyl), 5.75$\mu$ (5-ring ketone), 6.02, 6.19 and 6.25$\mu$ ($\Delta^{1:4}$-3-ketone).

Paper chromatographic examination of the two steroids reveals the following values:

| | Temperature, °C. | $R_f$ $A_3$ | $R_f$ $A_4$ |
|---|---|---|---|
| Propylene glycol/toluene | 22 | 0.11 | 0.20 |
| Formamide/benzene | 22 | 0.20 | 0.20 |
| Formamide/benzene-chloroform 1:1 | 22 | 0.51 | 0.51 |
| Bush C | 38 | 0.68 | 0.64 |
| Bush $B_5$ | 38 | 0.78 | 0.78 |
| Bush $B_1$ | 38 | 0.23 | 0.23 |
| Bush $BI_1$ | 38 | 0.47 | 0.47 |
| Bush $B_3$ | 38 | 0.07 | |
| Reaction with blue tetrazolium chloride | | Negative | Negative |
| Fluorescence with sodium hydroxide solution | | Nil | Nil |
| Reaction with meta-dinitrobenzene | | Purple | Negative |

$A_3 = \Delta^{1:4}$-3:17-dioxo-11$\beta$-hydroxy-18-nor-androstadiene.
$A_4 = $(18:11)-lactone of $\Delta^{1:4}$-3-oxo-11$\beta$:17$\beta$-dihydroxy-androstadiene-18-acid.

Example 5

A solution of 40 mg. of the (18:11)-lactone of $\Delta^{1:4}$-3-oxo-11$\beta$:17$\beta$-dihydroxy-androstadiene-18-acid in 1.9 cc. of absolute pyridine is mixed with 0.5 cc. of acetic anhydride and kept for 16 hours at room temperature. The reaction solution is then evaporated to dryness in a high vacuum. The residue is taken up in methylene chloride and washed with ice-cold N-hydrochloric acid, ice-cold sodium bicarbonate solution of 2% strength and with water until the washings run neutral. The methylene chloride solution is dried with sodium sulfate, evaporated to dryness under vacuum and the resulting (18:11)-lactone of $\Delta^{1:4}$-3-oxo-11$\beta$-hydroxy-17$\beta$-acetoxy-androstadiene-18-acid is recrystallized from a mixture of acetone and ether. It melts at 187 to 189° C. The infra-red spectrum in methylene chloride contains inter alia bands at 5.63$\mu$ [(18:11)-lactone], 5.77$\mu$ (acetate-carbonyl), 6.01, 6.16 and 6.23$\mu$ ($\Delta^{1:4}$-3-ketone) and 8.15$\mu$ (acetate). In the paper chromatogram the substance reveals the following $R_f$ and $R_S$ values:

| System | Temperature, °C. | $R_f$ | $R_S$ (S= desoxycorticosterone) |
|---|---|---|---|
| Bush $B_3$ | 38 | 0.28 | 0.53 |
| Formamide/cyclohexane-benzene 1:1 | 22 | 0.36 | 0.66 |
| Formamide/benzene | 22 | 0.80 | 1. |

Example 6

63 mg. of the (18:11)-lactone of $\Delta^{1:4}$-3-oxo-11$\beta$-dihydroxy-androstadiene-18-acid in 3 cc. of absolute pyridine are kept with 0.8 cc. of propionic anhydride at 22° C. The progress of the esterification is checked by paper chromatography. After 14 hours, the (18:11)-lactone of $\Delta^{1:4}$-3-oxo-11$\beta$-hydroxy-17$\beta$-propionoxy-androstadiene-18-acid is worked up as described for the acetate in Example 5. The infra-red spectrum of the product contains inter alia bands at 5.64$\mu$ (18:11)-lactone, 5.77$\mu$ (ester), 6.00, 6.16 and 6.22$\mu$ ($\Delta^{1:4}$-3-ketone) and 8.16$\mu$ (ester).

Example 7

The complex prepared from 84 mg. of chromic anhydride and 0.4 cc. of absolute pyridine, which is sparingly soluble in pyridine, is mixed with a solution of 120 mg. of $\Delta^{1:4}$-3:17-dioxo-11$\beta$-hydroxy-18-nor-androstadiene in 1.5 cc. of absolute pyridine, and the reaction mixture is shaken for 15 hours at room temperature. The mixture is then treated with 65 cc. of methylene chloride and 35 cc. of a sodium sulfite solution of 5% strength and adjusted with N-hydrochloric acid to pH=4. The whole is thoroughly agitated, the aqueous phase is separated and back-extracted twice with 30 cc. of methylene chloride. The three organic phases are washed neutral with water, dried with sodium sulfate and evaporated under vacuum. The residue is a mixture of the 11-keto compound with a small amount of starting material; it is subjected to preparative separation on 60 sheets of Whatman paper No. 1 in the system formamide/benzene. The zone absorbing ultra-violet of the less polar 11-keto steroid is eluted from the paper first with mixtures of tetrahydrofuran and water 1:4 and 1:1 and then with undiluted tetrahydrofuran. The eluates are evaporated under vacuum until they are free from tetrahydrofuran. Back-extraction of the aqueous suspension with methylene chloride yields $\Delta^{1:4}$-3:11:17-trioxo-18-nor-androstadiene which melts at 162.5 to 163.5° after recrystallization from acetone + ether. Its infra-red spectrum in methylene chloride contains bands inter alia at 5.71$\mu$ (17-ketone), 5.82$\mu$ (11-ketone), 5.99, 6.13 and 6.21$\mu$ ($\Delta^{1:4}$-3-ketone).

Result of paper chromatographic examination:

| System | Temperature, °C. | $R_f$ |
|---|---|---|
| Formamide/benzene | 22 | 0.68 |
| Bush $B_3$ | 38 | 0.25 |
| Bush $Bl_1$ | 38 | 0.78 |

Reaction with meta-dinitrobenzene: brownish.

Example 8

120 mg. of 13-iso-$\Delta^{1:4}$-3:17-dioxo-11$\beta$-hydroxy-18-nor-androstadiene in 5.8 cc. of absolute pyridine are shaken for 17 hours at room temperature with the complex obtained from 84 mg. of chromic anhydride in 0.4 cc. of absolute pyridine, and the 11-keto compound is isolated as described in Example 7, to yield 13-iso-$\Delta^{1:4}$-3:11:17-trioxo-18-nor-androstadiene, which melts at 245 to 247° C. after recrystallization from acetone + ether. The infra-red spectrum in methylene chloride contains bands inter alia at 5.75$\mu$ (17-ketone), 5.85$\mu$ (11-ketone), 6.02, 6.15 and 6.23$\mu$ ($\Delta^{1:4}$-3-ketone).

Result of paper chromatographic examination:

| System | Temperature, °C. | $R_f$ |
|---|---|---|
| Formamide/cyclohexane-benzene 1:4 | 22 | 0.45 |
| Formamide/benzene | 22 | 0.59 |
| Formamide/benzene-chloroform 2:1 | 22 | 0.85 |

Reaction with meta-dinitrobenzene: Brownish.

Example 9

A mixture of 25 mg. of $\Delta^{1:4}$-3:17-dioxo-11$\beta$-hydroxy-18-nor-androstadiene and 0.25 cc. of acetic anhydride in 2.25 cc. of absolute pyridine is kept for 48 hours at room temperature. The pyridine and the excess acetic anhydride are then removed in a high vacuum at room temperature. The oily residue is taken up in 15 cc. of methylene chloride, and the solution is washed with ice-cold N-hydrochloric acid, ice-cold sodium bicarbonate solution of 2% strength and with water until the washings run neutral, dried with sodium sulfate and evaporated under vacuum. The residue is recrystallized from acetone + petroleum ether (boiling range 50 to 70° C.). The resulting $\Delta^{1:4}$-3:17-dioxo-11$\beta$-acetoxy-18-nor-androstadiene melts at 209 to 211° C. Ultraviolet spectrum in ethanol: $\lambda_{max}=241$ m$\mu$, $\epsilon=15600$. Typical bands in the infra-red spectrum in Nujol appear inter alia at 5.78$\mu$ (17-ketone), 6.02, 6.18 and 6.24$\mu$ ($\Delta^{1:4}$-3-ketone), 8.12$\mu$ (acetate).

Result of paper chromatographic examination:

| System | Temperature, °C. | $R_f$ |
|---|---|---|
| Bush | 38 | 0.29 |
| Formamide/cyclohexane-benzene 1:1 | 22 | 0.41 |
| Formamide/benzene | 22 | 0.79 |

Reaction with meta-dinitrobenzene: purple.

Example 10

17.4 mg. of 13-iso-Δ$^{1,4}$-3:17-dioxo-11β-hydroxy-18-nor-androstadiene are acetylated for 26 hours at 70° C. with 0.25 cc. of acetic anhydride and 0.5 cc. of absolute pyridine. The resulting 13-iso-Δ$^{1,4}$-3:17-dioxo-11β-acetoxy-18-nor-androstadiene is worked up as described in Example 9 and is obtained in the form of a highly viscous, colourless oil. Its behaviour in the paper chromatogram, insofar as its R$_f$ value is concerned, is identical with that of Δ$^{1,4}$-3:17-dioxo-11β-acetoxy-18-nor-androstadiene.

Example 11

An ice-cold solution of 236 mg. of Δ$^{1,4}$-3:17-dioxo-11β-hydroxy-18-nor-androstadiene in 14 cc. of tetrahydrofuran is mixed with an ice-cold solution of 41 mg. of sodium borohydride in 2 cc. of tetrahydrofuran + water 2:1 and the whole is kept for 2 hours at 0° C. Without applying external heat the reaction mixture is then concentrated to about 6 cc. and 90 cc. of ice water and 1.2 cc. of glacial acetic acid are added. Extraction of the aqueous suspension with three portions of 180, 90 and 90 cc. of methylene chloride yields 219 mg. of a reduction product which is purified on a column of 7 grams of inactivated silica gel containing 15% by weight of water. Methylene chloride and a 95:5 mixture of methylene chloride and acetone elute weakly polar contaminants. A 9:1-mixture of methylene chloride and acetone elutes 171 mg. of Δ$^{1,4}$-3-oxo-11β:17β-dihydroxy-18-nor-androstadiene which is recrystallized from a mixture of acetone + ether + petroleum ether and melts at 181 to 183° C. Ultraviolet spectrum in ethanol: λ$_{max}$=244 mμ, ε=17000. Infra-red spectrum in methylene chloride: bands at 2.77 and 2.90μ (OH), 6.00, 6.14 and 6.22μ (Δ$^{1,4}$-3-ketone).

Example 12

20-hour-old cultures of *Arthrobacter simplex* (Jensen) Lochhead, ATCC 6946 which has been grown in fifty conical flasks of 500 cc. capacity in 100 cc. of nutrient solution each, are treated under sterile conditions and with even distribution with a solution of 1.75 grams of the (18:11) - lactone of Δ$^4$-3:20-dioxo-11β-hydroxy-pregnene-18-acid in 75 cc. of acetone and the cultures are treated for 19 hours on a shaking machine at a temperature of 26 to 27° C. 1 litre of nutrient solution contains 1 gram of Difco yeast extract, 4.4 grams of primary potassium phosphate and 8.8 grams of secondary sodium phosphate and has been adjusted to pH=7.1. For working up, all culture solutions are combined in a separating funnel, the nutrient medium is saturated with sodium chloride and agitated with 3 portions of 4.3 and 2 litres of ethyl acetate. The extracts are dried with sodium sulfate and filtered through 20 grams of inactivated silica gel containing 15% by weight of water. The filtrate is evaporated under vacuum and the residue (1.50 grams) is recrystallized from acetone + ether, to yield 1.31 grams of the (18:11)-lactone of Δ$^{1,4}$-3:20-dioxo-11β-hydroxy - pregnadiene-18-acid melting at 194–195° C. Ultra-violet spectrum in ethanol: λ$_{max}$=241 mμ, ε=18000. Infra-red spectrum in methylene chloride: bands at 5.66μ [(18:11)-lactone], 5.82μ (20-ketone), 5.99, 6.13 and 6.21μ (Δ$^{1,4}$-3-ketone).

Result of paper chromatographic examination:

| System | Temperature, °C. | R$_f$ | R$_s$ (S=desoxycorticosterone) |
|---|---|---|---|
| Formamide/cyclohexane-benzene 1:1 | 22 | 0.13 | 0.23 |
| Formamide/benzene | 22 | 0.58 | 0.71 |
| Propylene glycol/toluene | 22 | 0.53 | 0.72 |
| Bush B$_1$ | 38 | 0.34 | 0.46 |
| Bush B1$_1$ | 38 | 0.72 | |

Example 13

As described in Example 1, 2 grams of the 18:11-lactone of Δ$^{1,4}$-3:20-dioxo-11β-hydroxy-pregnadiene-18-acid are incubated for 4½ days with a culture of *Fusarium solani* grown in 4 litres of the nutrient solution described in Example 1. The mixture of the reaction products is subjected to paper chromatographic examination in the systems formamide/benzene and propylene glycol/toluene. It consists likewise of the following four degradation products:

(18:11)-lactone of Δ$^{1,4}$-3:17-dioxo-11β-hydroxy-androstadiene-18-acid, 13-iso-Δ$^{1,4}$-3:17-dioxo-11β-hydroxy-18-nor-androstadiene, Δ$^{1,4}$-3:17-dioxo-11β-hydroxy-18-nor-androstadiene, and (18:11)-lactone of the Δ$^{1,4}$-3-oxo-11β:17β-dihydroxy-androstadiene-18-acid which are separated as described in Example 1.

Example 14

0.40 gram of potassium chips are dissolved in a mixture of 5 cc. of tertiary butanol and 2.5 cc. of absolute benzene. Dry acetylene is passed through this solution until saturation has been achieved. The resulting potassium acetylide solution is added dropwise under exclusion of moisture and with stirring at room temperature to 0.32 gram of Δ$^{1,4}$-3:17-dioxo-11β-hydroxy-18-nor-androstadiene in 30 cc. of a 1:1-mixture of dioxane and tetrahydrofuran. With continued stirring, acetylene is then passed for 2½ hours through the reaction mixture. For working up 100 cc. of aqueous acetic acid of 2% strength are added and the whole is repeatedly extracted with methylene chloride. The methylene chloride extracts are washed with water until neutral, dried with sodium sulfate and evaporated under vacuum, to yield 0.37 gram of crude Δ$^{1,4}$ - 3 - oxo - 11β:17β - dihydroxy - 17α - ethinyl - 18-nor-androstadiene which is recrystallized from methylene chloride + hexane.

What is claimed is:

1. The (18→11β)-lactone of Δ$^{1,4}$-3:17-dioxo-11β-hydroxy-androstadiene-18-acid.

2. Δ$^{1,4}$ - 3 - oxo - 11β:17β - dihydroxy - 17α - ethinyl-18-nor-androstadiene.

References Cited by the Examiner

UNITED STATES PATENTS

| | | | |
|---|---|---|---|
| 2,837,464 | 6/58 | Nobile | 195—51 |
| 2,877,161 | 3/59 | Sebek et al. | 195—51 |
| 2,902,498 | 9/59 | Fried et al. | 260—239.55 |
| 3,040,039 | 6/62 | Wettstein et al. | 260—239.55 |

LEWIS GOTTS, *Primary Examiner.*